T. H. GRAYDON.

SHOE SOLE CUTTING MACHINE.

APPLICATION FILED MAY 4, 1918.

Reissued June 8, 1920.

14,876.

2 SHEETS—SHEET 1.

INVENTOR.

Thomas H. Graydon

By his Attorney

Nelson W. Howard

T. H. GRAYDON.
SHOE SOLE CUTTING MACHINE.
APPLICATION FILED MAY 4, 1918.
Reissued June 8, 1920.
14,876.
2 SHEETS—SHEET 2.
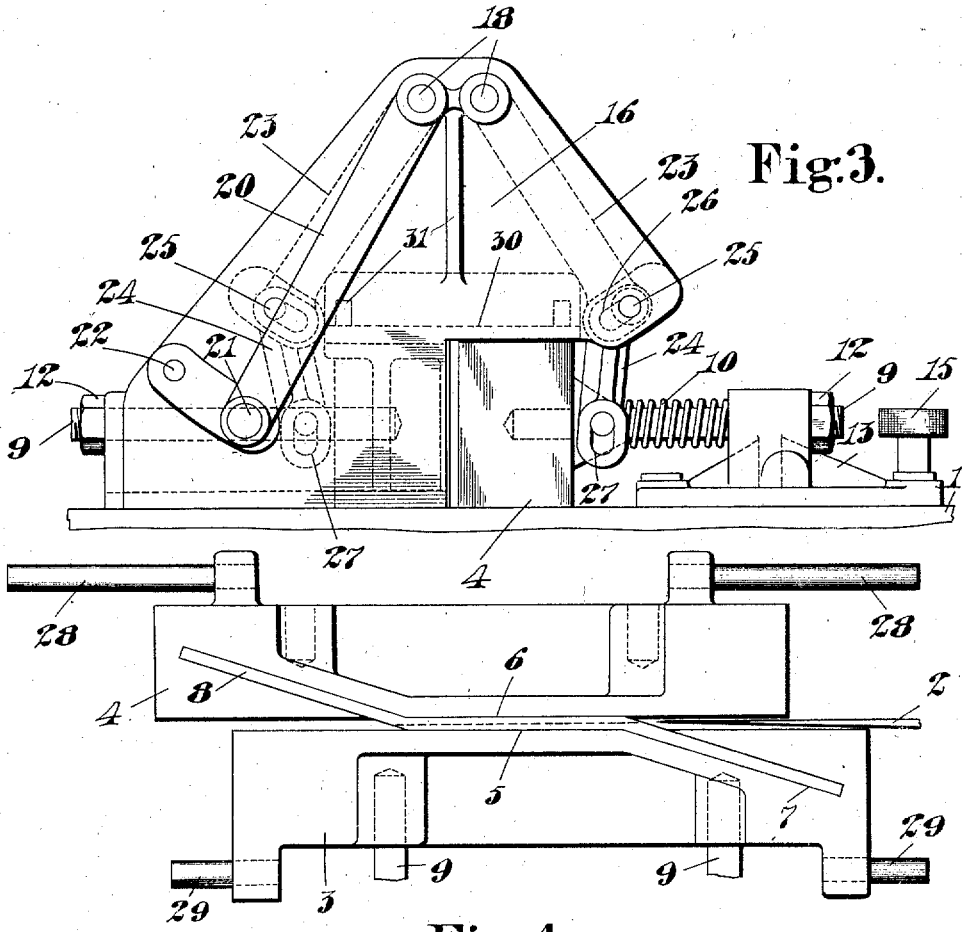
Fig:3.
Fig:4.
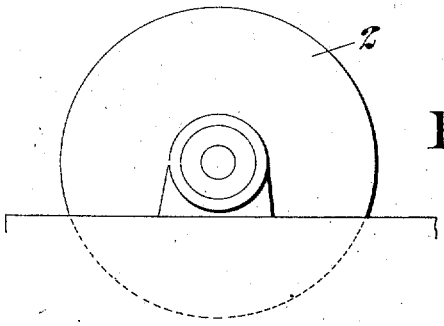
Fig:5.
INVENTOR.
Thomas H. Graydon
By his Attorney,
Nelson M. Howard

UNITED STATES PATENT OFFICE.

THOMAS H. GRAYDON, OF CINCINNATI, OHIO, ASSIGNOR TO UNITED SHOE MACHINERY CORPORATION, OF PATERSON, NEW JERSEY, A CORPORATION OF NEW JERSEY.

SHOE-SOLE-CUTTING MACHINE.

14,876. Specification of Reissued Letters Patent. Reissued June 8, 1920.

Original No. 1,236,425, dated August 14, 1917, Serial No. 95,344, filed May 4, 1916. Application for reissue filed May 4, 1918. Serial No. 232,658.

*To all whom it may concern:*

Be it known that I, THOMAS H. GRAYDON, a citizen of the United States, residing at Cincinnati, in the county of Hamilton and State of Ohio, have invented new and useful Improvements in Shoe-Sole-Cutting Machines, of which the following is a specification.

My invention relates to machines for cutting shoe soles out of pieces of leather so as to produce two soles out of one thickness of leather, with the toe portions of the original thickness and the shanks or the shanks and heels of but half the thickness. The object of so cutting the soles is that in each pair of soles there is saved that amount of leather necessary otherwise to form a shank or to form a shank and heel.

It is not necessary to provide for a heel portion at all on the outer sole of all shoes as, in the cheaper shoes, a piece of inferior leather may be secured to the shank portion which will serve as the basis for the heel of the shoe.

The illustrative machine is designed to operate upon blanks which may be sliced or severed to produce two short soles having shank portions of substantially one-half the thickness of the toe portions or to operate upon blanks which may be sliced or severed to produce two full length soles having shank and heel portions of substantially one-half the thickness of the toe portions.

In the adaptation of my invention to be hereinafter described, the holders for the shoe sole blank are not made movable except to accommodate the insertion of the work, and the device is intended to be employed with any desired form of traveling slicing or cutting knife. The parts described then seat on the table of the cutting machine.

In the drawings, the description of which follows, the traveling or cutting knife and its traveling mechanism is only shown in a diagrammatic way, as it is obviously within the province of the mechanic skilled in the art of movable cutting knives to employ mechanism for operating a beveled or rotary slicing knife so that it will operate vertically and can be moved in a suitable slot to cut or slice apart the blank of leather.

As will be obvious, the table portion could just as well be made movable and the knife left stationary, by moving the table instead of the knife in a like path, but no such structure is described, although it would come within the scope of my invention, because it is preferred and is less expensive, to have the knife travel and the device as described to hold the work stationary.

The object above noted I accomplish by that certain construction and arrangement of parts to be hereinafter more specifically pointed out and claimed.

In the drawings,

Fig. 3 is a right side elevation thereof;

Fig. 4 is a top plan view of the blocks for holding the blank to be cut;

Fig. 5 is a diagrammatic view showing a cutting knife.

Figure 1:
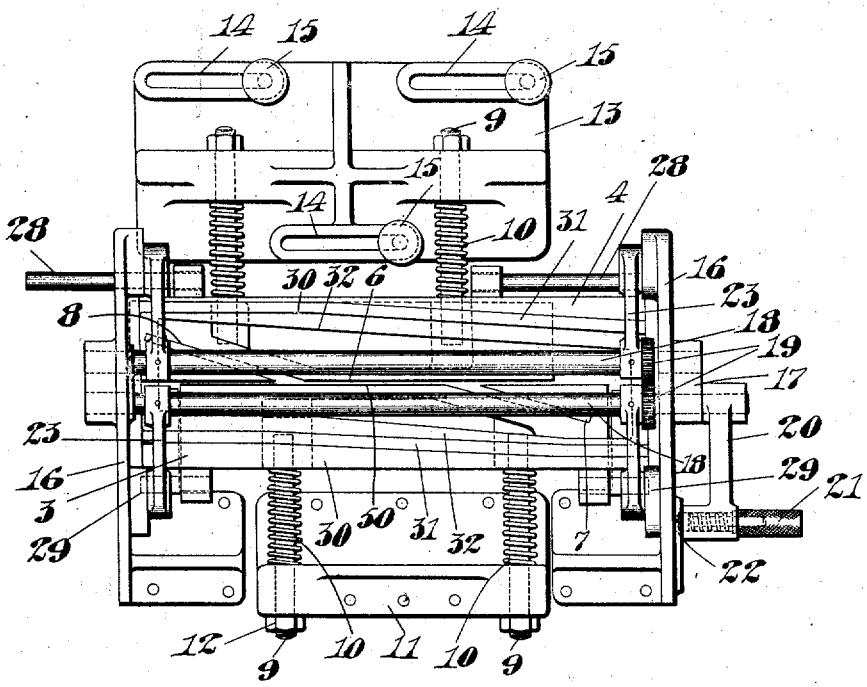
Figure 1 is a top plan view of the device.
Figure 2:
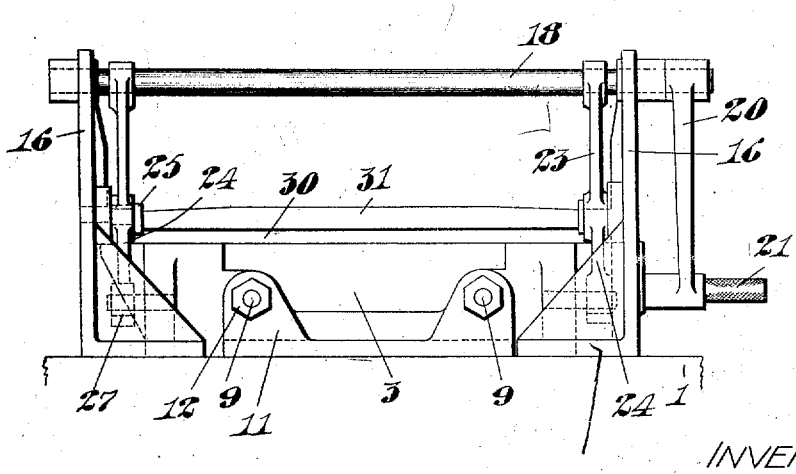
Fig. 2 is a front elevation thereof.

It will be understood that the parts to be described are to be mounted on the table 1 of a rotary cutter having a revolving knife 2 which travels in a suitable slot in the table. Over this slot, held as will be described, are a pair of blocks 3 and 4. The block 4 is to be movable laterally and the block 3 stationary as far as lateral movement is concerned. Both blocks might be so movable, but it has been found that the movement of one of them is easier to control and determine.

The blocks face each other over the slot in the cutter table, and are adapted to hold or grip the sole leather blank to be cut. The portion of the blank that is to be common to both completed soles is to lie between the faces 5 and 6 of the two blocks respectively, and the toe portion of one sole extends off at an angle in the slot 7 of the block 3, and the other toe portion into the slot 8 in the block 4. Means will be described whereby the blocks are to be slightly separated to allow insertion of the work, and for closing them together over the sole leather blank so as to hold it centered over the slot in the table. When the knife passes along in the slot (Fig. 4), the leather will be cut in half along the portions lying between the two blocks, and this cut will result in two soles, one having the shank and heel unfinished on both sides and the other having but one flesh side. The result of the cut will naturally depend upon the shape of the blank, and as above stated, one of the blocks is movable relative to the other, thereby acommodating different sizes of blanks, which have their common portions to be sliced of varying lengths dependent upon the sizes of the soles to be used.

The fixed block 3 is held slidably on the upper surface of the table by means of pins 9, 9 which are surrounded by springs 10, 10. The pins enter suitable holes in the block, and are slidably mounted in a plate 11 which is secured to the top of the table. The length of pin extending in from the plate 11 is controlled by nuts 12 on the outer end of the pins where they protrude from the plate.

The result of this mounting is that the block is resiliently slidable in one direction on the table, but is not movable laterally. This lateral movement is also prevented by side plates to be hereinafter described.

The other block (4) is mounted on like pins 9, held by a plate 13. This plate has slots 14, through which pass the securing bolts 15 that hold it to the table. As a result, the position of the plate 13 may be controlled by the loosening of the bolts so as to change the relative position of the two holding blocks. So as to allow this lateral movement of the block 4, the side plates above referred to are cut away as will be described.

The balance of the mechanism deals with the means for moving the two blocks apart for allowing insertion of the work. For this purpose two side plates 16, 16 are provided, said plates abutting against the block 3 and cut away adjacent the block 4 for the purpose above noted.

Mounted in a suitable boss 17 in the side plates are two shafts 18, 18, which have at the right hand end intermeshing gears 19, 19. The one shaft 18 extends through the boss and has mounted on its end the operating handle 20. The handle has a finger piece or plunger 21 that seats at one end of the movement of the handle in a socket 22 in the right hand side plate.

Fixedly secured to the shafts 18, 18, at each end are four arms 23, which are adapted to spread apart when the two shafts are rocked. These arms support links 24, which have pins 25 riding in slots 26 in the arms. The links have slots 27 at their other ends, which slots engage suitable pins extending laterally from the two blocks.

For the adjustable block the pins are long as shown at 28, so that the said operating device is adaptable to the adjustment of the block in a lateral direction. For the non-adjustable block the pins are short, as shown at 29. Resting on the top of the two blocks is the top plate 30, which is reinforced by ribs 31, and is secured in some suitable manner to the side plates or standards 16. This top plate is cut away along the lines 32, 32, at each side of the meeting line of the blocks, said line of cut slanting so as to clear the angling slots in the blocks also.

As thus described the operation of the device is as follows:—The movement of the handle of the shifting mechanism will spread the arms 23, which will exert a slight pull to put the pins on the blocks, thereby separating them a small distance for the insertion of a blank of leather. The blank being already cut to the proper size is inserted between the blocks, with the toe portions of the blank in the two angling slots in the blocks. The adjustable block is then moved along until the portion of the blank that is to be sliced is alone located between the blocks and the balance of the blank located in the angling slots.

During this adjustment the blocks are held apart by the finger hold plunger 21 on the handle dropping into the socket in the side plate or standard. When the parts are adjusted, the handle is released by drawing out the plunger and is brought down to draw the blocks together over the piece of leather. The blocks will also come together of their own accord because of the springs on the pins that are used in guiding and mounting the blocks, and these springs serve to hold the blocks resiliently together over the leather, so as to allow the proper play when the knife is passing through in making its slicing cut, the intermediate portion of the leather being held in position to be intersected by the plane of the cut of the knife.

The cutting machine is then put in operation, whereupon, the rotary knife will revolve and move along in the slot in the machine table. This will sever the two portions of leather of the blank for two shoe soles, leaving the intermediate portions beveled down from the original thickness and with the main body of the said cut portions of just one half the thickness of the portions of the soles that were held in the angling slots in the blocks.

Although the invention has been set forth as embodied in a particular machine, it should be understood that the invention is not limited in the scope of its application to the particular machine which has been shown and described.

Having thus described my invention, what I claim as new and desire to secure by Letters Patent, is:

1. In a machine of the character described, a knife and a holder for a portion of leather, said knife and holder being relatively movable, said holder comprising abutting members having means thereon for holding certain parts of the leather away from the abutting faces of the said members, and means whereby the relative movement brings the knife between the said abutting faces.

2. In a machine of the character described, a knife and a holder for a portion of leather, said knife and holder being relatively movable, said holder comprising two blocks having their faces abutting each other and angling slots therein extending away from the abutting faces, to retain certain portions of the leather away from the abutting faces, and means whereby the relative movement brings the knife between said abutting faces.

3. In a machine of the character described, a knife and a holder for a portion of leather, said knife and holder being relatively movable, said holder comprising abutting members, having means thereon for holding certain parts of the leather away from the abutting faces of the said members, and means whereby the relative movement brings the knife between the said abutting faces, said members being resiliently held against each other, for the purpose described.

4. In a machine of the character described, a knife and a holder for a portion of leather, said knife and holder being relatively movable, said holder comprising abutting members having means thereon for holding certain parts of the leather away from the abutting faces of the said members, and means whereby the relative movement brings the knife between the said abutting faces, said members being adjustable with relation to each other to bring the said holding away means on the members into various positions with relation to each other.

5. In a machine of the character described, a knife and a holder for a portion of leather, said knife and holder being relatively movable, said holder comprising abutting members having means thereon for holding certain parts of the leather away from the abutting faces of the said members, means whereby the relative movement brings the knife between the said abutting faces, and means for separating the said members for the insertion of work.

6. In combination with a cutting machine having a movable knife and a table for supporting the same, a pair of holding members mounted on said table, said members abutting each other over the line of path of the knife, and means in each member to hold away from the said line, portions of leather which are not to be sliced by the knife.

7. A machine for operating upon a sole blank, having two toe portions and an intermediate portion comprising a cutter and means for gripping the blank and presenting it to the cutter in such manner that the blank is severed by a cut the major portion of which is located in a plane substantially parallel to the planes of the upper and lower surfaces of the blank and substantially midway between them.

8. A machine for operating upon a blank, having two toe portions and an intermediate portion comprising a cutter, means for gripping the blank, means for causing the cutter to sever the blank, and means including the gripping means for bending the blank in such manner that the severing cut divides the blank into two smaller blanks each of which has a toe portion of the thickness of the original blank and a shank portion beveled down from the original thickness with the main body of the shank portion of substantially one half the thickness of the original blank.

9. A machine of the class described, having, in combination, a knife adapted to produce a cut located in a given plane, means for holding the middle portion of a blank in position to be intersected by said plane and the end portions bent out of said plane, and means for causing the knife to sever the blank so held.

10. In a machine of the character described, a knife, means for gripping a portion of a blank, said knife and gripping means being relatively movable, means for holding a certain part of the blank away from the gripping means, and means for causing the knife to pass through the gripped portion of the blank.

In testimony whereof I have signed my name to this specification.

THOMAS H. GRAYDON.